US008503677B2

(12) United States Patent
Yao et al.

(10) Patent No.: US 8,503,677 B2
(45) Date of Patent: Aug. 6, 2013

(54) COMMUNICATION SYSTEM AND DEVICE

(75) Inventors: Taketsugu Yao, Osaka (JP); Kiyoshi Fukui, Mie (JP); Jun Nakashima, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 219 days.

(21) Appl. No.: 12/926,451

(22) Filed: Nov. 18, 2010

(65) Prior Publication Data

US 2011/0188653 A1 Aug. 4, 2011

(30) Foreign Application Priority Data

Jan. 29, 2010 (JP) ................................ 2010-018791

(51) Int. Cl.
*H04L 29/06* (2006.01)

(52) U.S. Cl.
USPC ................ 380/255; 380/28; 380/29; 380/30; 380/256; 380/257; 380/258; 380/259; 380/260; 713/160; 713/161; 713/162; 713/163; 713/164; 713/165; 713/166; 713/167; 709/225; 709/229

(58) Field of Classification Search
USPC ............. 380/28–30, 255–261; 713/160–170; 709/225, 229
See application file for complete search history.

(56) References Cited

U.S. PATENT DOCUMENTS

| | | | | | |
|---|---|---|---|---|---|
| 7,506,052 | B2 * | 3/2009 | Qian et al. | .................... | 709/224 |
| 7,756,162 | B2 * | 7/2010 | Adachi et al. | ................. | 370/501 |
| 2003/0105964 | A1 * | 6/2003 | Brainard et al. | .............. | 713/178 |
| 2004/0268123 | A1 * | 12/2004 | Le et al. | ....................... | 713/160 |
| 2005/0094637 | A1 * | 5/2005 | Umesawa et al. | ............. | 370/389 |
| 2008/0285746 | A1 * | 11/2008 | Landrock et al. | ............... | 380/29 |
| 2010/0042831 | A1 | 2/2010 | Bahr et al. | | |
| 2010/0061272 | A1 * | 3/2010 | Veillette | ........................ | 370/254 |
| 2011/0002251 | A1 * | 1/2011 | Shin et al. | ..................... | 370/311 |
| 2012/0066764 | A1 * | 3/2012 | Kim | ............................... | 726/22 |

FOREIGN PATENT DOCUMENTS

JP 2008-547257 T 12/2008

* cited by examiner

*Primary Examiner* — David Pearson
*Assistant Examiner* — Josnel Jeudy
(74) *Attorney, Agent, or Firm* — Rabin & Berdo, P.C.

(57) ABSTRACT

A communication device receives secure communication frames on which a security transform has been performed to permit authentication. The communication device maintains an authentication history and a local time varying parameter. In multi-hop communication, the communication device provisionally verifies the freshness of a received secure communication frame by verifying that identifying information extracted from the frame is not already present in the authentication history and that a received time varying parameter extracted from the frame is not older than the local time varying parameter by more than a certain margin. If these freshness tests both pass, the frame is authenticated. If authentication succeeds, the frame is transmitted on the next hop without performance of a new security transform.

15 Claims, 15 Drawing Sheets

FIG.3

HISTORY TABLE

| SOURCE ADDRESS | RECEIVED COUNTER |
|---|---|
| C | 0011 |
| D | 0011 |
| F | 0010 |
| H | 0009 |

COMMUNICATION SYSTEM AND DEVICE

BACKGROUND OF THE INVENTION

1. Field of the Invention

The present invention relates to low-delay multi-hop communication.

2. Description of the Related Art

Multi-hop communication is used in many communication networks, including wireless mesh networks. In a wireless mesh network, each communication device or node communicates directly with other nodes within its wireless communication range, and communicates with nodes outside that range by having communication frames or packets passed from one node to another in bucket-brigade fashion. One advantage of wireless mesh networks is that they can operate at low transmitting power levels, since the transmitted signal only has to reach the neighboring nodes. Another advantage is the robustness of the mesh network topology, in which alternate communication routes can easily be found to replace routes that become unavailable because a communication device is damaged or taken out of service. In a conventional star topology network, in contrast, a failure at the central node disables the entire network.

Wireless networks in general are susceptible to the malicious injection of external data, so authentication of the communicated data is an important issue. In a wireless multi-hop network, each of the many relay nodes is a possible point of entry of malicious data, so authentication at the relay nodes is particularly important.

Various security transform schemes are used to protect network communications. One scheme employs a network key shared by all nodes in the network but unknown to potential attackers, and uses the network key to encrypt each communication frame. Another scheme uses the network key to perform a transform on part or all of the content of the communication frame to generate a digital signature or message authentication code which is attached to the communication frame, enabling the receiving communication device and each intermediate communication device to verify the authenticity of the frame.

Even if both encryption and an authentication transform are used, however, these schemes fail to defend the network against replay attacks. In a replay attack the attacker intercepts a transmitted frame and retransmits the frame later, without alteration. A communication device that receives the replayed frame is likely to decrypt and authenticate it successfully and accept it as a legitimate communication frame. Replay attacks can be used for various surreptitious purposes, and can also be used to disable a network by forcing it to waste time and battery charge in processing large numbers of repeated frames. Preventing replay attacks is a major problem for a secure communication system using a shared network key.

One method of thwarting replay attacks is to change the security key each time a communication frame is transmitted. In multi-hop transmission, however, this requires each intermediate node, after authenticating the received communication frame, to carry out a new security transform before relaying the frame to the next node. The repeated transform processing uses up computing resources at the intermediate nodes and significantly delays the arrival of the communication frame at its final destination.

In PCT patent application WO 2006/134001 (published in Japanese as Japanese Patent Application Publication No. 2008-547257 and in English as U.S. Patent Application Publication No. 20100042831), Bahr et al. describe a scheme that addresses these problems. The communication frame or packet includes payload data and control data, e.g., header data. The payload data are encrypted at the source node and decrypted at the final destination node, using a first key shared by these two nodes. The control data are encrypted and decrypted separately on each hop of the communication route, using a second key shared by the nodes at the two ends of the hop. A non-repeating key may be used as the second key. The processing load on intermediate nodes is reduced in that they do not have to decrypt the payload data, but transmission is still delayed by the time spent re-encrypting the control data at every hop, especially if this requires generating a new second key each time a communication frame is relayed.

When the processing capability of the communication devices in the communication network is low, performing a new security transform at each intermediate node can lead to troublesome delays in multi-hop communication. There is a need for a security method that defeats replay attacks without incurring such delays.

SUMMARY OF THE INVENTION

An object of the present invention is to provide a communication system and device that can perform secure low-delay communication in a multi-hop network without requiring a new security transform at each hop.

The invention provides a novel communication device including a receiver that receives secure communication frames from other communication devices. Each received secure communication frame includes received identifying information and a received time varying parameter. The received secure communication frame was originally generated by a process including a security transform performed on at least the received time varying parameter.

A history manager in the communication device maintains received authentication history information and performs a first freshness test by searching for the received identifying information in the received authentication history information. The first freshness test fails if the received identifying information is found, and passes if the received identifying information is not found.

A time varying parameter manager in the communication device maintains a local time varying parameter and a margin, and performs a second freshness test by comparing the received time varying parameter with the local time varying parameter. The second freshness test fails if the received time varying parameter is older than the local time varying parameter by more than the margin, and passes if this is not the case.

An authentication key manager in the communication device maintains an authentication key related to the security transform. An authentication processor in the communication device uses the authentication key to authenticate the received secure communication frame when the first and second freshness tests both pass. The received secure communication frame is discarded without authentication if either freshness test fails.

The received identifying information may include the received time varying parameter. If authentication succeeds, the history manager may add the received identifying information to the received authentication history information.

The novel communication device may further include a transmitter and may relay received and successfully authenticated secure communication frames to other communication devices without performing another security transform.

The received secure communication frame may have been transmitted by a communication device including a time varying parameter manager, a secret key manager, a frame generator that generates a communication frame including the local time varying parameter, then uses the secret key to transform the communication frame into a secure communication frame, and a transmitter that transmits the secure communication frame.

The invention also provides a novel communication system including a plurality of the novel communication devices described above.

By using two freshness tests, the inventive communication device is able to defeat replay attacks without requiring a new security transform each time a communication frame is relayed on a new hop.

The margin enables the novel communication system to operate without precise synchronization of the local time varying parameters maintained at different communication devices.

The invention conserves memory because the novel communication device does not need to store the most recent time varying parameter value received from each other communication device in the communication system, and because identifying information old enough to be rejected as non-fresh on the basis of the local time varying parameter can be deleted from the received authentication history information.

BRIEF DESCRIPTION OF THE DRAWINGS

In the attached drawings:

FIG. 3 is a table showing exemplary authentication history information in the first embodiment;

DETAILED DESCRIPTION OF THE INVENTION

Figure 1:
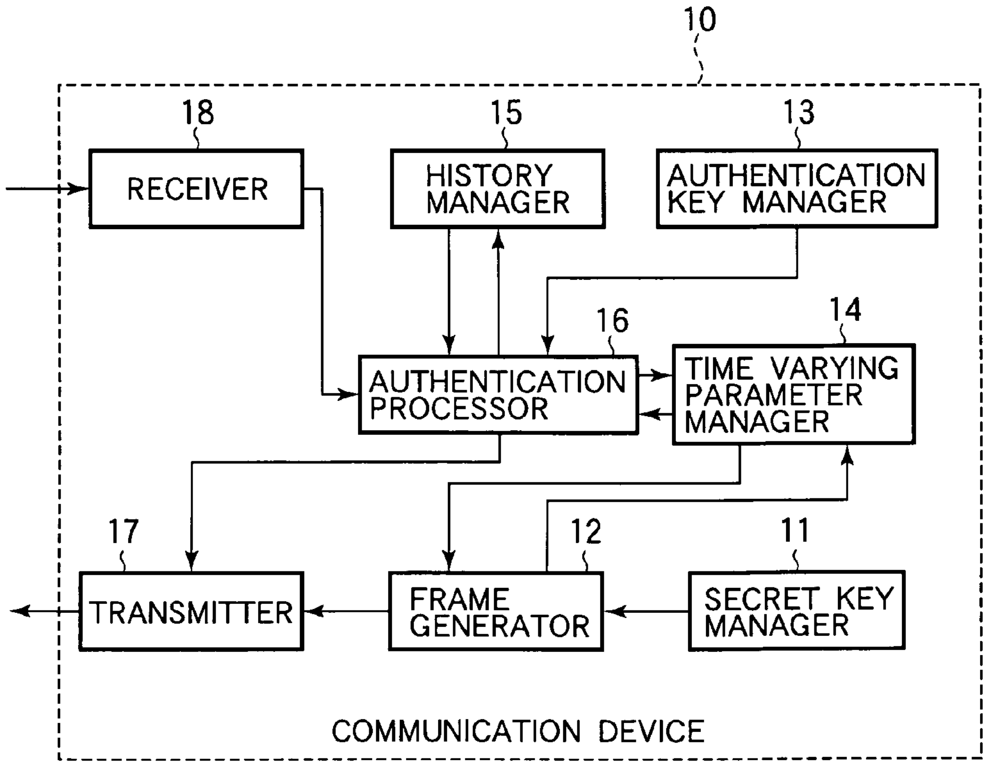
FIG. 1 is a block diagram illustrating the internal structure of a communication device in a first embodiment of the invention.

Embodiments of the invention will now be described with reference to the attached drawings, in which like elements are indicated by like reference characters. Each embodiment is a communication system employing communication devices of the novel type.

First Embodiment

Referring to FIG. 1, the communication device in the first embodiment includes at least a secret key manager 11, a frame generator 12, an authentication key manager 13, a time varying parameter manager 14, a history manager 15, an authentication processor 16, a transmitter 17, and a receiver 18. In general, the communication device will also include facilities (not shown) for processing data, generating control signals, etc.

The secret key manager 11 manages a secret key used for performing a security transform on communication frames. The secret key may be a shared key such as a network key, or a private key such as the private key of a public/private key pair of the type used in public key cryptography. The secret key manager 11 may generate different secret keys at different times from a shared master key.

The frame generator 12 receives the secret key from the secret key manager 11 and a local time varying parameter from the time varying parameter manager 14, incorporates the local time varying parameter into a communication frame, and uses the secret key to execute a security transform that converts the communication frame into a secure communication frame. Contemplated security transforms include, but are not limited to, addition of a digital signature generated by use of a private key or an authentication code generated by use of a shared key to the communication frame, and encryption of part or all of the communication frame. The term ‘authenticator’ will be used below to denote a digital signature, an authentication code, or any similar sort of authentication information. In the description that follows, the secure communication frame has the exemplary structure shown in FIG. 2, including a destination address, a source address, the time varying parameter, payload data, and an authenticator generated from the other fields by use of the secret key. The payload data and the authenticator may be encrypted, as indicated, as part of the security transform, so that the security transform consists of an authentication transform followed by encryption.

The frame may include other fields as well, such as a frame sequence number field.

Referring again to FIG. 1, the frame generator 12 sends the generated secure communication frame to the transmitter 17 and notifies the time varying parameter manager 14 that the frame has been sent.

The authentication key manager 13 manages an authentication key used for authentication of received secure communication frames. The authentication key may be a shared key such as a network key, or the public key of a public/private key pair for public key cryptography. When shared keys are used, the secret key manager 11 and authentication key manager 13 may manage the same key.

The time varying parameter manager 14 manages the local time varying parameter. In the first embodiment the local time varying parameter is a counter value that the time varying parameter manager 14 increments whenever notified by the frame generator 12 that a new secure communication frame has been sent to the transmitter 17. The time varying parameter manager 14 may also update the local time varying parameter in response to the time varying parameter value in a secure communication frame received from another communication device, in order to maintain approximate synchronization of the local time varying parameter values at different communication devices.

In the following description of the first embodiment, the local and received time varying parameters will be referred to as local and received counter values.

The time varying parameter manager 14 also manages a margin α. Although the quantity α is given a fixed value of '3' for simplicity in the description below, the quantity α is a variable that may be adjusted flexibly according to, for example, the size of the communication system and the type and volume of communication traffic it handles.

The time varying parameter manager 14 obtains a received counter value taken from a received secure communication frame by the authentication processor 16, compares the received counter value with the local counter value to test the freshness of the received secure communication frame, and notifies the authentication processor 16 of the test result. In the first embodiment, the time varying parameter manager 14 makes a provisional decision that the secure communication frame is fresh if the received counter value is equal to or greater than the local counter minus the margin α. This is equivalent to saying that the received counter value is not older than the local counter value by more than α. The decision is provisional because the received communication frame has not been successfully authenticated yet, and may be inauthentic or corrupt. If authentication succeeds, and if the received counter value is equal to or greater than the local counter value, the time varying parameter manager 14 increments the local counter value.

The history manager 15 manages received authentication history information that identifies received secure communication frames that have been successfully authenticated. In the first embodiment, the received authentication history information is managed in a history table as shown in FIG. 3. Each entry in this exemplary history table includes the source address and counter value of a received and successfully authenticated secure communication frame as identifying information. The identifying information should identify the received frame uniquely. The identifying information may include other information (not shown), such as frame sequence numbers. If necessary, each successfully authenticated secure communication frame may be stored in its entirety in the history table.

The history manager 15 also tests the freshness of a received but not yet authenticated secure communication frame by obtaining identifying information, taken from the received frame by the authentication processor 16, and searching for matching identifying information in the history table. If matching information is found, the history manager 15 notifies the authentication processor 16 that the received communication frame is not fresh, because it has already been received. Otherwise, the history manager 15 notifies the authentication processor 16 that the received communication frame is (provisionally) fresh.

After notifying the authentication processor 16 that a received secure communication frame is fresh, if the history manager 15 receives return notification that the frame has been successfully authenticated, the history manager 15 adds the identifying information of the frame as a new entry to the history table.

When the history manager 15 stores a new entry in the history table, it may also delete one or more old entries. In the first embodiment, an old entry is deleted if its counter value is less than (i.e., older than) the current local counter value by more than the margin α. This deletion does not weaken the freshness criteria, because a newly received frame matching the deleted entry will be rejected as non-fresh by the time varying parameter manager 14, and need not also be rejected by the history manager 15.

The authentication processor 16 receives a secure communication frame from the receiver 18, extracts its source address and counter value, sends the counter value to the history manager 15 as a received counter value, and sends both the source address and counter value to the time varying parameter manager 14 as identifying information. If notified by both the time varying parameter manager 14 and history manager 15 that the frame is provisionally fresh, the authentication processor 16 uses the authentication key managed by the authentication key manager 13 to authenticate the frame. Known authentication methods may be used. The authentication processor 16 notifies the time varying parameter manager 14 and history manager 15 of the authentication result.

If authentication fails, the frame may be discarded. If authentication succeeds, the authentication processor 16 takes different actions depending on the destination address of the frame. If the destination address is the address of the communication device itself, the authentication processor 16 passes the frame to other facilities (not shown) to be processed locally. If the destination address is the address of another communication device, the authentication processor 16 sends the frame to the transmitter 17. If the destination address is a broadcast or flooding address, the frame is both processed locally and sent to the transmitter 17. When the frame is sent to the transmitter 17, it is sent as is, with its existing counter value and authenticator and without a new security transform.

The transmitter 17 transmits a secure communication frame obtained from the frame generator 12 or the authentication processor 16 to other communication devices within communication range. If the communication system uses a multi-layer protocol stack with a data link layer at the bottom of the stack and if the secure communication frame belongs to an upper layer of the stack, the transmitter 17 may transmit the secure communication frame by placing it in a data link frame.

The receiver 18 receives secure communication frames transmitted by other communication devices and passes them to the authentication processor 16.

The operation of the communication system in the first embodiment will now be described with reference to FIGS. 4 to 9. First a general description of the operation of the transmission and reception process will be given.

Transmission and reception in the first embodiment take place in three major stages.

Figure 2:
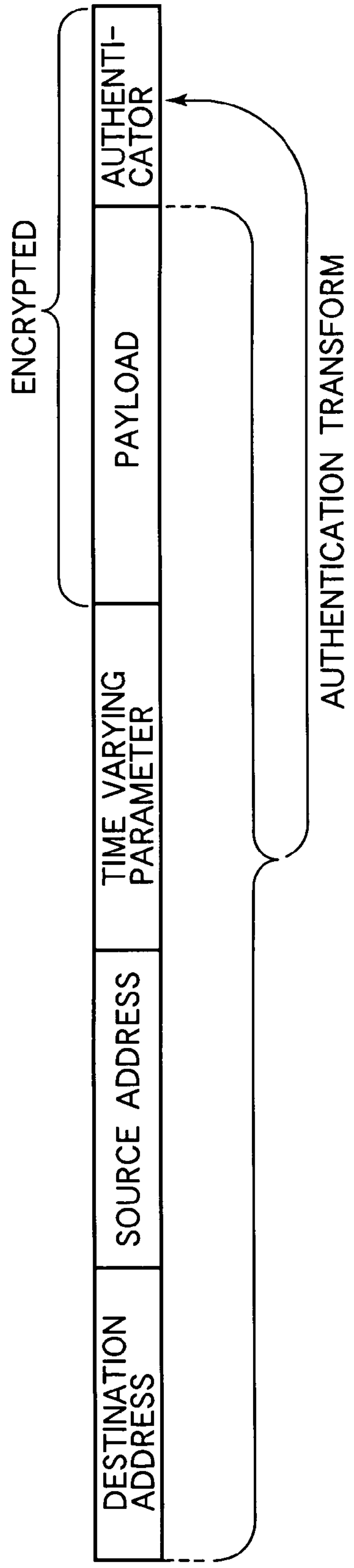
FIG. 2 illustrates an exemplary structure of a secure communication frame in the first embodiment.
Figure 4:
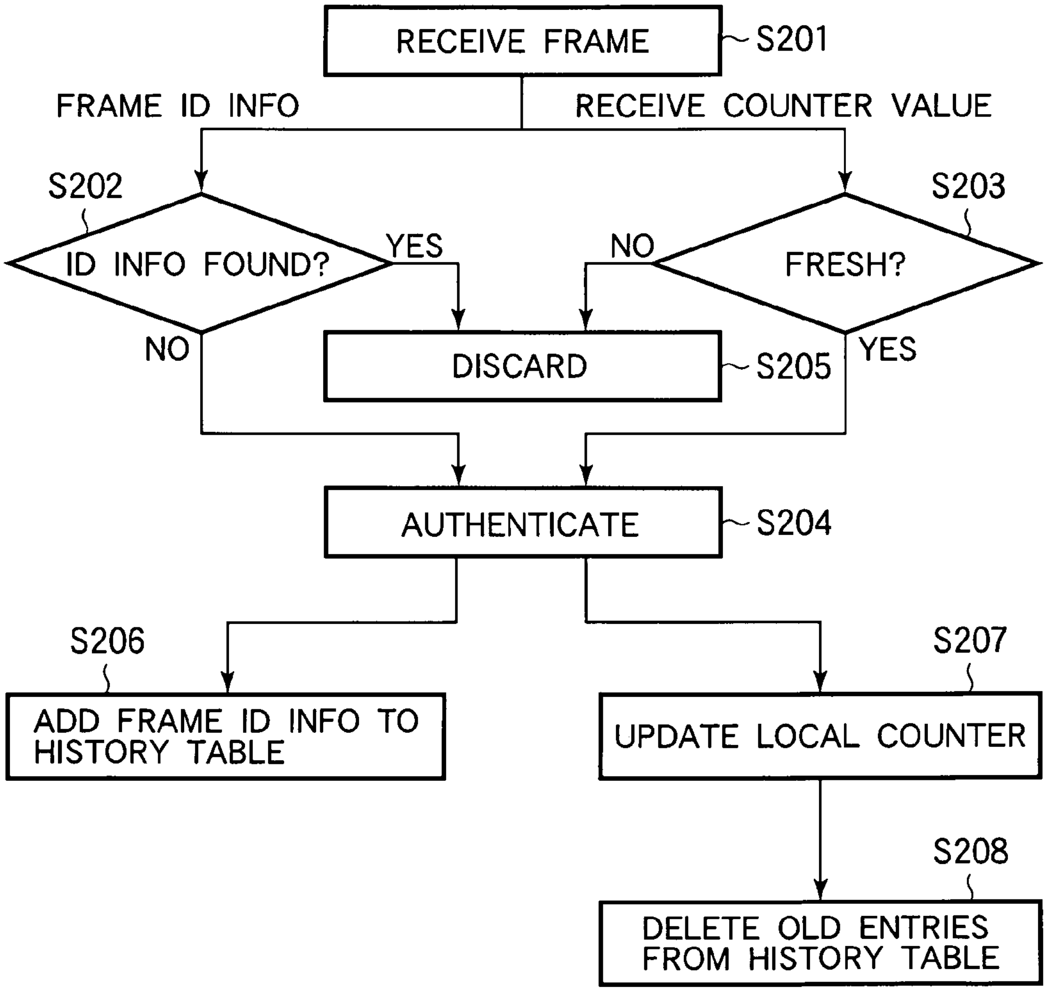
FIG. 4 is a flowchart illustrating the operation of the communication device on reception of a secure communication frame in the first embodiment.

In the first stage, the frame generator 12 in the communication device that originates the transmission receives the secret key from the secret key manager 11, the local counter value from the time varying parameter manager 14, and payload data from another facility (not shown), adds a destination address, a source address, and the local counter value, and performs a security transform to generate a secure communication frame of the type shown in FIG. 2. The security transform includes generating the authenticator from at least the local counter value by use of the secret key, and in this embodiment also includes encryption. When this process is completed, the frame generator 12 sends the secure communication frame to the transmitter 17 and notifies the time varying parameter manager 14, which increments the local counter value by one.

In the second stage, the transmitter 17 transmits the secure communication frame.

In the third stage, the secure communication frame is received by one or more neighboring communication devices and authenticated at each of them. The authentication operation will be described with reference to the flowchart in FIG. 4.

In step S201, the secure communication frame is received by the receiver 18 at a neighboring communication device and passed to the authentication processor 16 in that device. The authentication processor 16 extracts identifying information (in this embodiment, the source address and received counter value) from the secure communication frame, sends the identifying information (denoted 'frame ID info' in the drawing) to the history manager 15, and sends the received counter value to the time varying parameter manager 14.

The history manager 15 checks to see whether the identifying information received from the authentication processor 16 is already present in its history table (step S202). If the identifying information is not present in the history table, the history manager 15 notifies the authentication processor 16 that the frame is provisionally fresh.

The time varying parameter manager 14 tests the counter value received from the authentication processor 16 by comparing it with the local counter value minus the margin $\alpha$ as described above (step S203). If this freshness test passes (if the received counter value is equal to or greater than the local counter value minus $\alpha$), the time varying parameter manager 14 notifies the authentication processor 16 that the frame is provisionally fresh.

When the authentication processor 16 is notified by both the history manager 15 and the time varying parameter manager 14 that the received secure communication frame is provisionally fresh, it authenticates the secure communication frame by use of the authentication key supplied by the authentication key manager 13 (step S204). If authentication succeeds, the authentication processor 16 notifies the time varying parameter manager 14 and the history manager 15.

If the freshness test performed in either step S202 or S203 fails, the secure communication frame is discarded without authentication (step S205). The secure communication frame may also be discarded if it passes the freshness tests in steps S202 and S203 but fails authentication in step S204.

On being notified of successful authentication, the history manager 15 adds the identifying information of the secure communication frame as a new entry to the history table (step S206).

On being notified of successful authentication, the time varying parameter manager 14 may update the local counter value (step S207). Specifically, if the received counter valued is equal to the local counter value, the time varying parameter manager 14 increments its own counter value by one. If the received counter valued is greater than (newer than) the local counter value, the time varying parameter manager 14 may increment the local counter value by more than one. If the received counter value is less than (older than) the local counter value, the local counter value is left unchanged.

When the time varying parameter manager 14 increments the local counter value in step S207, the history manager 15 deletes any entries in the history table that have counter values older than the new local counter value (step S208) by more than the margin $\alpha$.

In general, a communication frame may be unicast to a single destination address, multicast to a specified group of destination addresses, or broadcast to all communication devices in the communication system. The operation of the first embodiment will now be described through an example in which two secure communication frames are broadcast and one of them is intercepted and replayed. An exemplary mesh network with communication devices A to S will be used. It will be assumed that communication devices A to S all start with identical local counter values of '0012', and that their history tables all include entries for frames received from communication devices C, D, F, and H with respective received counter values of '0011', '0011', '0010', and '0009'.

Figure 5:
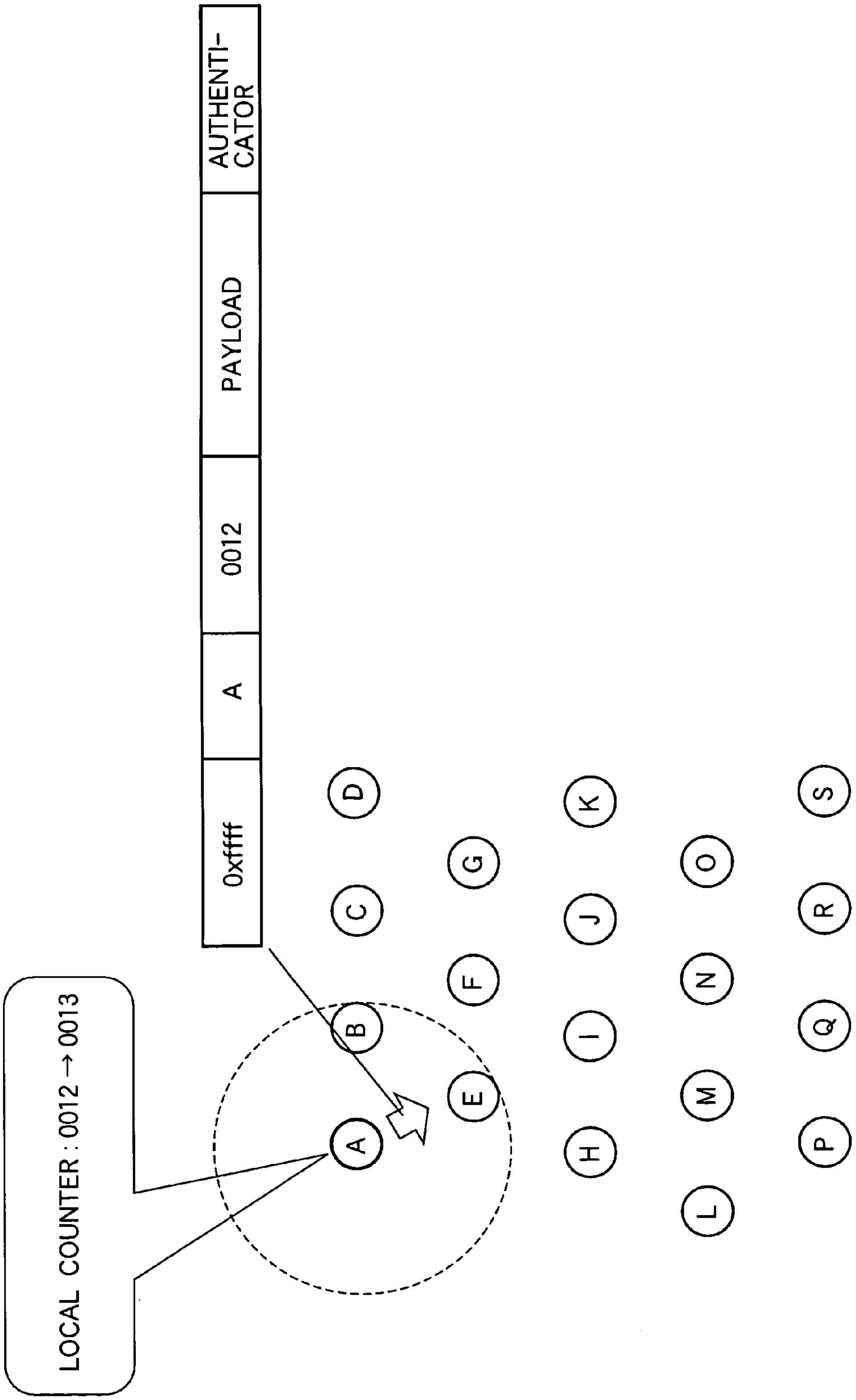
FIG. 5 illustrates the transmission of a secure communication frame in the first embodiment.

In FIG. 5, communication device A broadcasts a first secure communication frame that is received by neighboring communication device E. The destination address is '0xffff', indicating a broadcast frame. The source address is 'A' and the counter value is '0012'. The frame also includes payload data and an authenticator. After transmission of this first secure communication frame, the time varying parameter manager 14 in communication device A increments its local counter value to '0013'.

Figure 6:
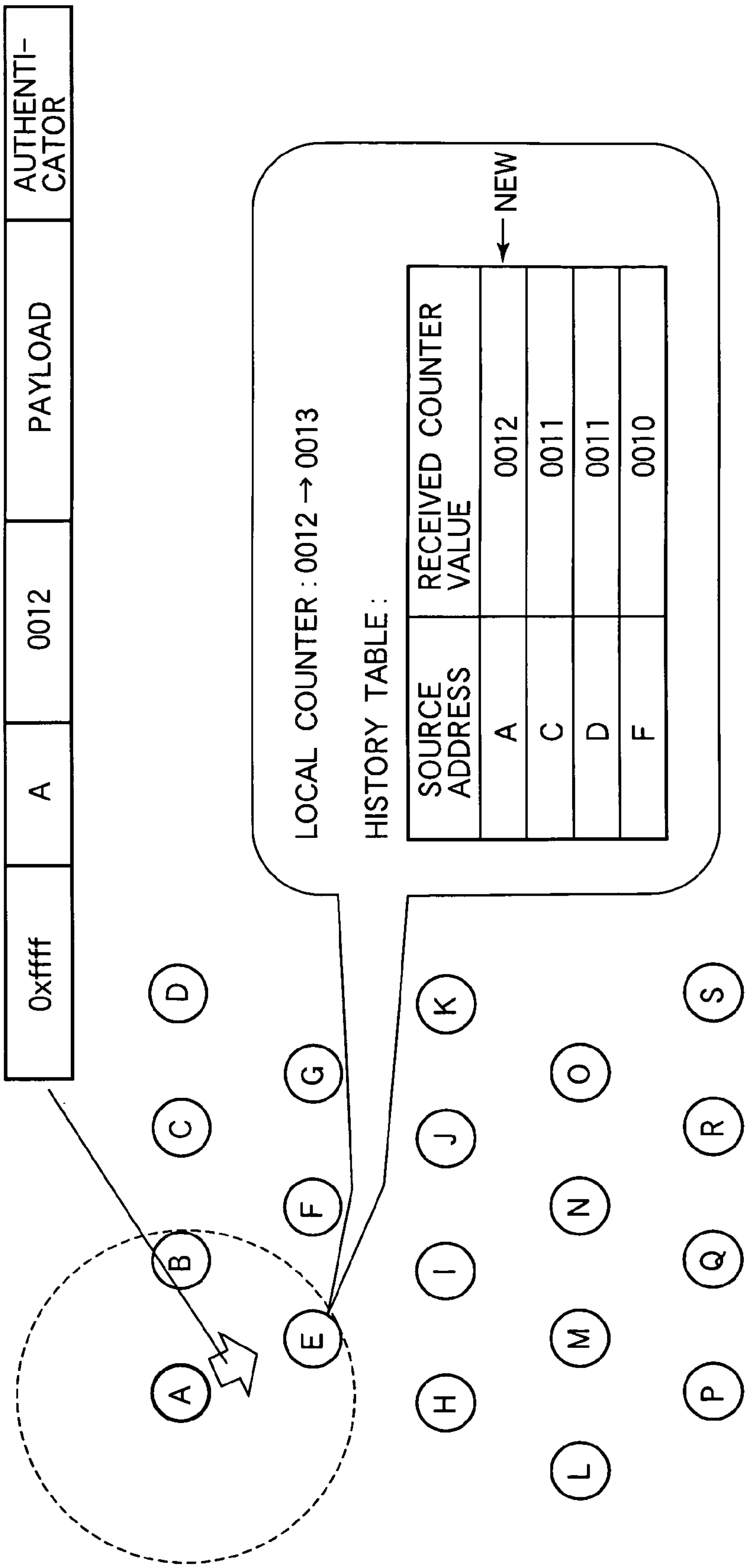
FIG. 6 illustrates the authentication of the secure communication frame in FIG. 5.

In FIG. 6, communication device E receives the first secure communication frame from communication device A and compares the identifying information of the frame with the entries in the history table at communication device E. The history table currently has no entry with source address A, so the history manager 15 notifies the authentication processor 16 that the frame is provisionally fresh.

In the meantime, the time varying parameter manager 14 in communication device E compares the received counter value ('0012') with its local counter value ('0012') minus the margin $\alpha$ ('3'). This test passes ($12 \geqq 12-3$), so the history manager 15 also reports that the frame is provisionally fresh, and the authentication processor 16 proceeds with authentication. It will be assumed that authentication passes, so the time varying parameter manager 14 increments its local counter value to '0013', and the history manager 15 adds a new entry to the history table indicating source address A and counter value '0012'.

The counter value ('0009') in the bottom entry in the history table now differs from the local counter value ('0013') by more than the margin $\alpha$ ($13-9>3$), so the history manager 15 deletes this entry, as indicated by the strike-out line in the drawing.

A similar process is carried out at communication device B when it receives the first secure communication frame from communication device A.

Figure 7:
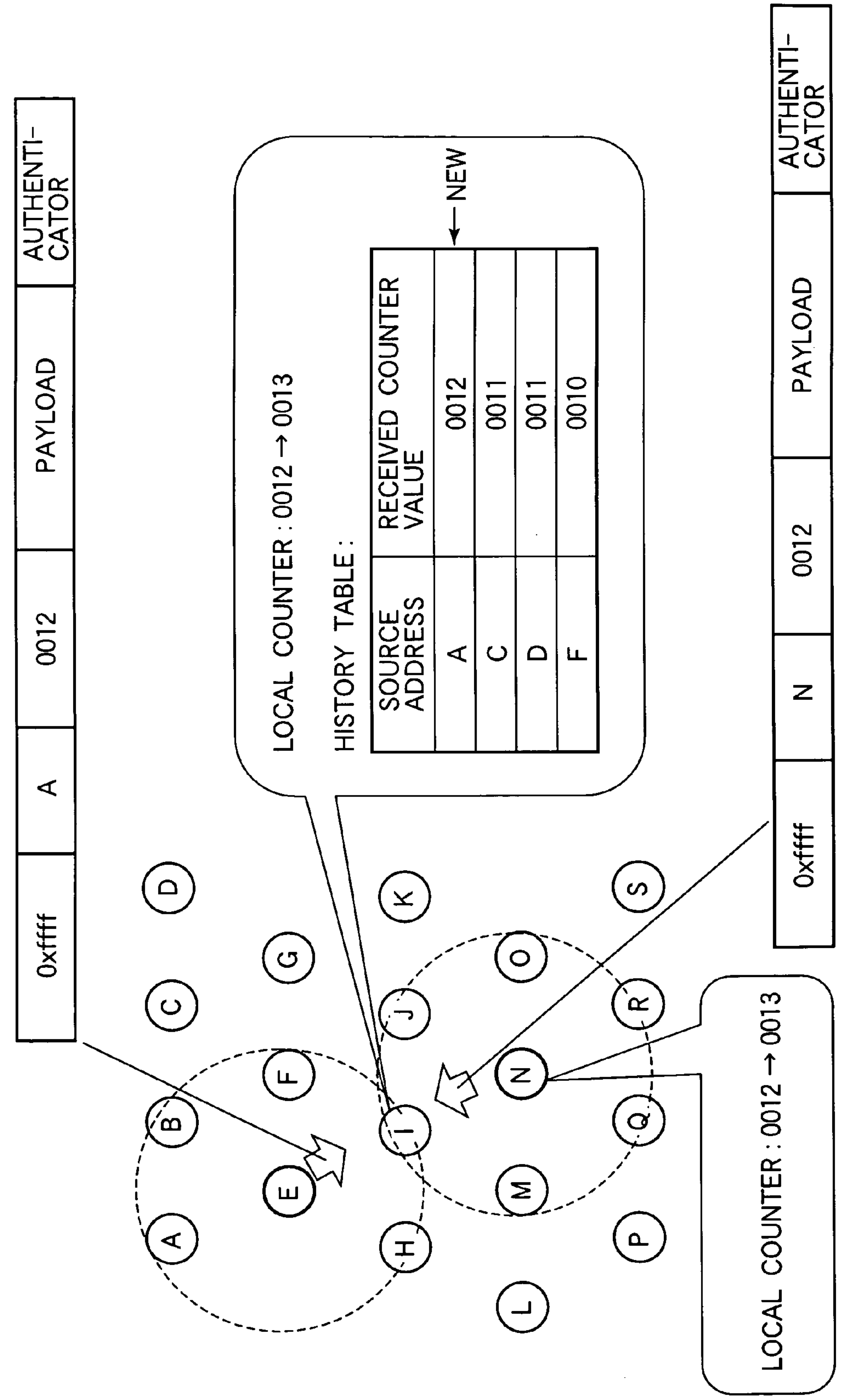
FIG. 7 illustrates the relaying of two secure communication frames in the first embodiment.

Referring to FIG. 7, communication device E now relays the first secure communication frame to communication device I (and other neighboring communication devices). This process is carried out in the same way as the transmission of the first secure communication frame from communication device A to communication device E in FIGS. 5 and 6. The counter value in the transmitted frame remains the same ('0012'). The time varying parameter manager 14 at communication device I increments its local counter from '0012' to '0013'. The history manager 15 at communication device I updates its history table in the same way as in FIG. 6.

Shortly after receiving the first secure communication frame communication device E, communication device I receives a second secure communication frame broadcast from communication device N. Communication device N broadcasts the second secure communication frame in the same way that communication device A broadcast the first secure communication frame, inserting counter value '0012' and broadcast destination address '0xffff', but with source address 'N'. After transmitting the second secure communication frame, communication device N increments its local counter from '0012' to '0013'.

Figure 8:
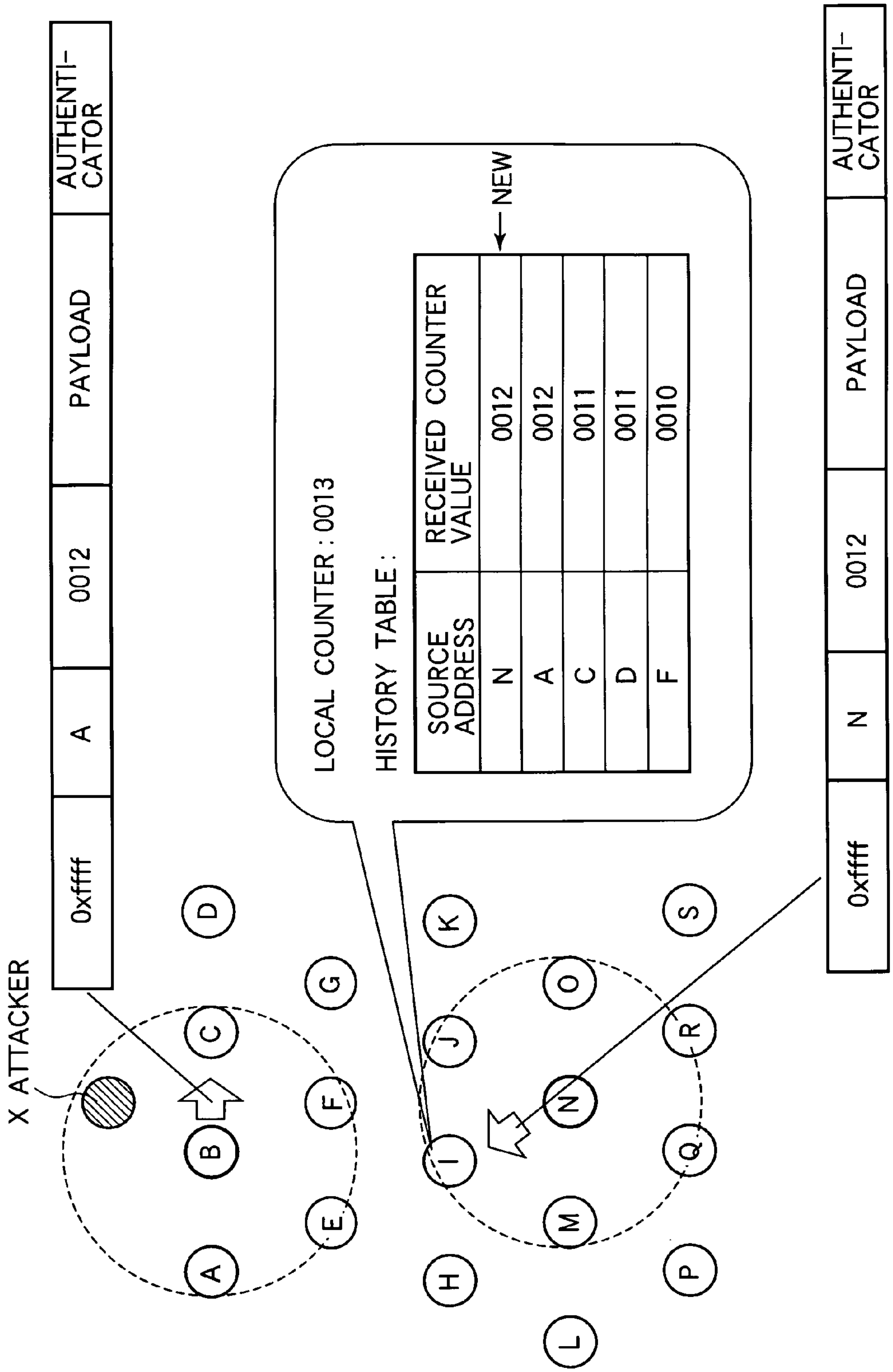
FIG. 8 illustrates the interception of a secure communication frame by an attacker in the first embodiment.

When communication device I receives the second secure communication frame from communication device N, it performs the same process as when it received the first secure communication frame from communication device E. Specifically, it provisionally confirms that the second secure communication frame is fresh because the received counter value ('0012'), although now older, is within the margin α ('3') of the local counter value ('0013') and because no corresponding entry (source address N, counter value '0012') is present in the history table. It then authenticates the second secure communication frame successfully, and adds a corresponding new entry to its history table as shown in FIG. 8. Communication device I leaves its local counter value at '0013', because this value is already newer (greater) than the received counter value '0012' in the second secure communication frame.

The counter values of all entries in the history table at communication device I are equal to or greater than '0010' ('0013'−α), so no entries are deleted.

In the meantime, the first secure communication frame is relayed from communication device B to communication device C, as shown at the top of FIG. 8. The relay process is the same as the relay process from communication device E to communication device I, except that the relayed frame is intercepted by an attacker X.

Figure 9:
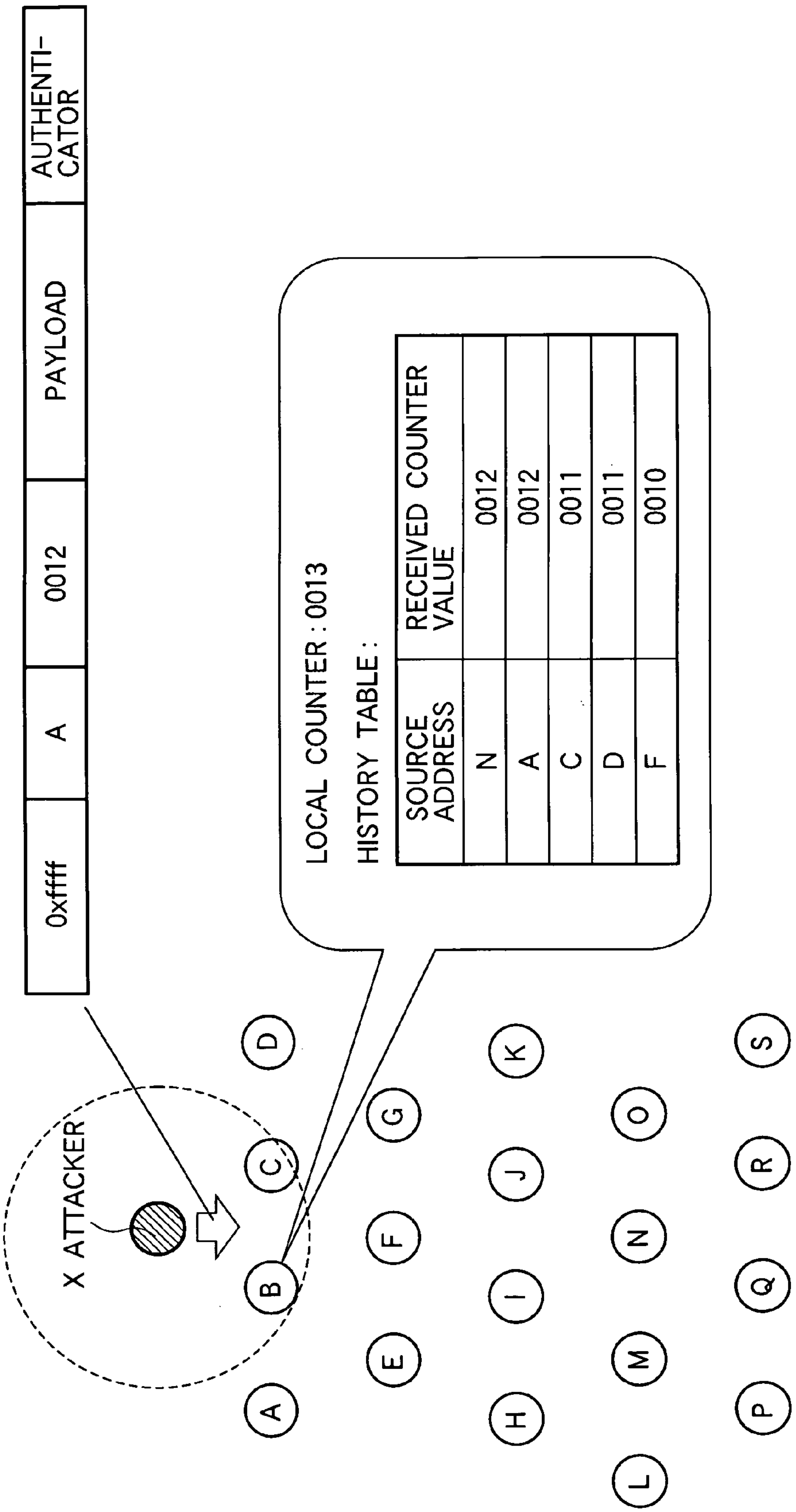
FIG. 9 illustrates the replaying of the communication frame intercepted by the attacker.

Referring to FIG. 9, at a later time, the attacker X replays the intercepted first secure communication frame by transmitting it to communication devices B and C. On receiving the replayed first secure communication frame, the time varying parameter manager 14 in communication device B provisionally decides that the received frame is fresh because the counter value '0012' is equal to or greater than the threshold value '0010' ('0013'−α), but the time varying parameter manager 14 decides that the frame is not fresh because an entry with source address 'A' and counter value '0012' is already present in the history table. The replayed frame is therefore discarded without being authenticated, and is not relayed to other communication devices.

Communication device C similarly discards the replayed first secure communication frame without authenticating or relaying it. The replay attack fails.

As will be appreciated from the foregoing description, when a secure communication frame is broadcast through the network, each communication device that relays the secure communication frame only has to verify its freshness from the counter value and the history table, authenticate the frame, and then transmit the frame without alteration, without having to perform another security transform. Accordingly, the frame propagates quickly through the entire network. Compared with a conventional multi-hop communication system that requires decryption, authentication, a new authentication transform, and re-encryption at each hop, the first embodiment, which requires only decryption and authentication, requires only about half as much processing. A corresponding reduction in power consumption and transmission delay can be expected.

If the broadcast frame is intercepted by an attacker and replayed, the communication devices that receive the replayed frame will normally discard it without authentication, either because its counter value is too old or, as in the example above, because an identical entry is already present in the history table. The replay attack will therefore fail.

Even if a replayed frame is received by a communication device that has not yet received the original frame, is accepted as fresh, and is authenticated successfully and relayed onward, the system includes some built-in safeguards that limit the damage caused by the replay attack. One safeguard is that the communication device that is fooled into relaying the replayed frame can be fooled only once, because when it relays the frame it also stores an entry for the frame in its history table. Another safeguard is that, if the frame is addressed to a specific destination, by the time the replayed frame reaches the destination address the original frame generally will also have reached the destination address, so the destination communication device will reject the replayed frame without processing it.

Since entries are deleted from the history table when their counter values become too old to be considered fresh, the history table does not consume a large amount of memory space in the communication device.

Since the margin α is allowed in the counter freshness test, it is not necessary for the communication devices to maintain strict synchronization of their counter values, and frames will not be rejected as non-fresh just because the local counters at different communication devices are slightly out of synchronization In particular, as shown in FIGS. 7 and 8, two different communication devices (A and N) can broadcast secure communication frames at about the same time without risk that a receiving communication device (I) will accept only the frame it receives first and reject the frame received later as non-fresh.

Nor is it necessary for each communication device to maintain a separate counter value for each other communication device in the system, as is done in some conventional security schemes.

The first embodiment thus provides an adequate defense against replay attacks without causing delays in multi-hop transmission, and without imposing excessive demands on the communication devices in terms of memory space or time varying parameter synchronization.

In a variation of the first embodiment, the counter values are decremented instead of being incremented, and a received counter value equal to or less than the local counter value plus α is determined to be fresh.

In another variation of the first embodiment, the history manager 15 keeps a record of all received secure communication frames in the history table instead of just recording successfully authenticated frames.

In still another variation, the history table has a fixed size. Instead of deleting entries when they become older than the local counter value, the history manager 15 allows entries to accumulate in the history table until the table is full, after which, each time authentication succeeds, the oldest entry is replaced by a new entry.

Second Embodiment

The communication system and device in the second embodiment employ a time value as the time varying parameter.

Figure 10:
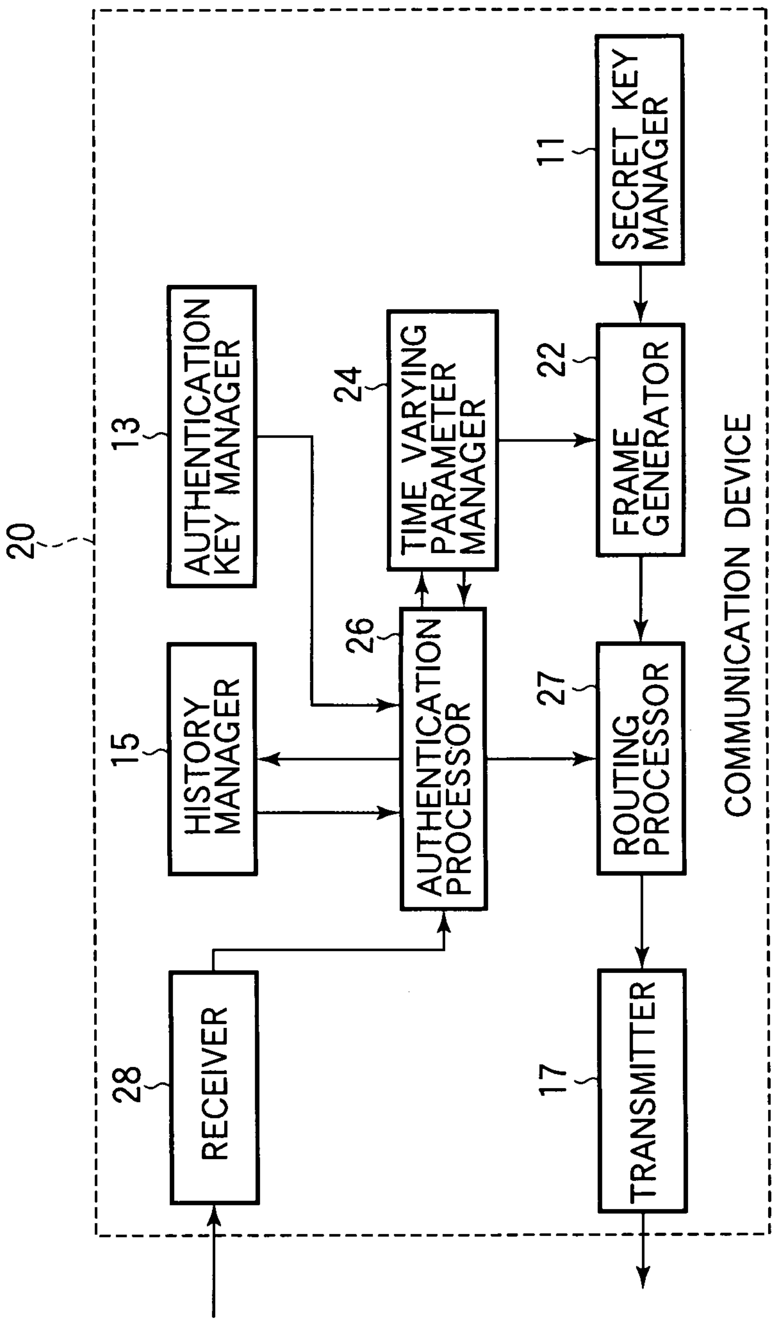
FIG. 10 is a block diagram illustrating the internal structure of a communication device in a second embodiment of the invention.

Referring to FIG. 10, the communication device 20 in the second embodiment includes a secret key manager 11, an authentication key manager 13, a history manager 15, and a transmitter 17 that operate as described in the first embodiment, a frame generator 22, a time varying parameter manager 24, an authentication processor 26, and a receiver 28 that operate somewhat differently from the corresponding elements in the first embodiment, and a newly added routing processor 27. The communication system in the second embodiment includes a plurality of communication devices of the type shown in FIG. 10.

The time varying parameter manager 24 in the second embodiment includes a facility for managing a local time value as a local time varying parameter. The time value may represent the date and time of day. Alternatively, the time value may be a system time that is used only in the communication system. The facility for managing the local time value may be a real-time clock, or a counter that is incremented or decremented at regular intervals measured by a system clock or real-time clock (not shown) provided separately in the communication device 20. All communication devices in the communication system maintain substantially synchronized local time values.

The frame generator 22 maintains routing information, such as a routing table, indicating preferred transmission routes from the communication device 20 to each other communication device in the system. The frame generator 22 supplies routing information to the time varying parameter manager 24 and routing processor 27 as necessary. When generating a new communication frame, the frame generator 22 uses the routing information to determine a hopcount indicating the number of hops on the preferred route to the destination communication device, obtains the current time value from the time varying parameter manager 24, places this time value and the hopcount in the frame, executes the security transform, and sends the resulting secure communication frame to the routing processor 27. The frame generator 22 need not notify the time varying parameter manager 24 that the secure communication frame has been sent.

When the routing processor 27 receives a secure communication frame from the authentication processor 26 or frame generator 22, it encapsulates the secure communication frame in a one-hop frame by adding one-hop address information including the transmitter and receiver addresses of the hop, and sends the one-hop frame to the transmitter 17 to be transmitted. The transmitter address is the address of the communication device 20 itself. The receiver address is determined from the routing information maintained in the frame generator 22. If the frame is a broadcast frame, the receiver address may be a broadcast address. The one-hop frame may be a data-link frame.

When the communication device 20 receives a one-hop communication frame from another communication device, if the receiver address is the address of the communication device 20 itself, or a broadcast address, the receiver 28 passes the encapsulated secure communication frame to the authentication processor 26. The authentication processor 26 passes the source address and time value in the received secure communication frame to the history manager 15 as identifying information and passes the destination address, the time value, and the hopcount value to the time varying parameter manager 24. If the freshness tests pass and authentication succeeds, and if the destination address of the secure communication frame is a broadcast address or the address of a different communication device, the authentication processor 26 also passes the frame to the routing processor 27.

The time varying parameter manager 24 tests freshness by comparing the received time value obtained from the authentication processor 26 with the local time value managed by the time varying parameter manager 24 itself. The freshness test fails if the received time value is older than the local time value by more than a margin β, and succeeds if this is not the case. The time varying parameter manager 24 determines the margin β from the received hopcount and destination address.

Figure 11A:
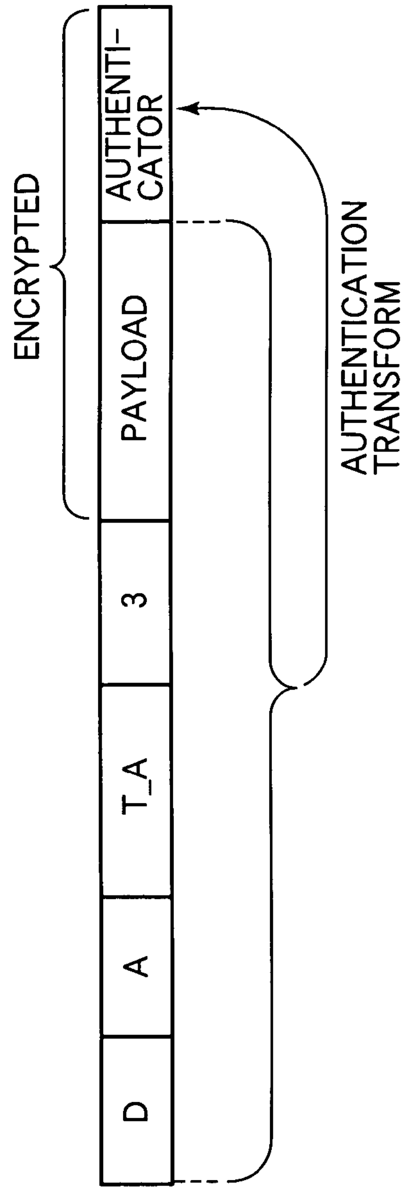
FIG. 11A illustrates a secure communication frame in the second embodiment.

FIG. 11A shows an exemplary secure communication frame generated at a communication device A for multi-hop transmission to another communication device D. The route from communication device A to communication device D is a three-hop route passing through intermediate communication devices B and C. The destination address is 'D' and the source address is 'A'. The time varying parameter is the local time value T_A supplied by the time varying parameter manager 24 at communication device A when the secure communication frame was generated by the frame generator 22 at communication device A. The hop-count '3' follows the time value T_A and precedes the payload. The authenticator is generated by an authentication transform performed on the source and destination addresses 'A' and 'D', the time value T_A, the hopcount '3', and the payload data. The authenticator and payload data are then encrypted.

Figure 11B:
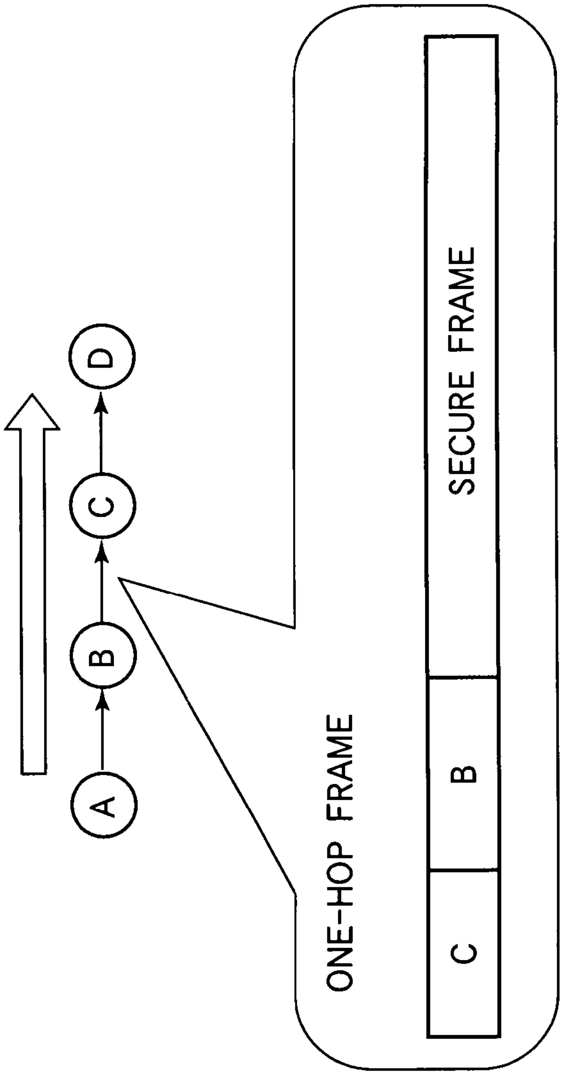
FIG. 11B illustrates a one-hop communication frame in the second embodiment.

FIG. 11B shows how this secure communication frame is encapsulated for transmission on the middle hop from communication device B to communication device C. The routing processor 27 at communication device B generates a one-hop communication frame by prefixing 'B' and 'C' as a transmitter address and receiver address to the secure communication frame shown in FIG. 11A.

Figure 12:
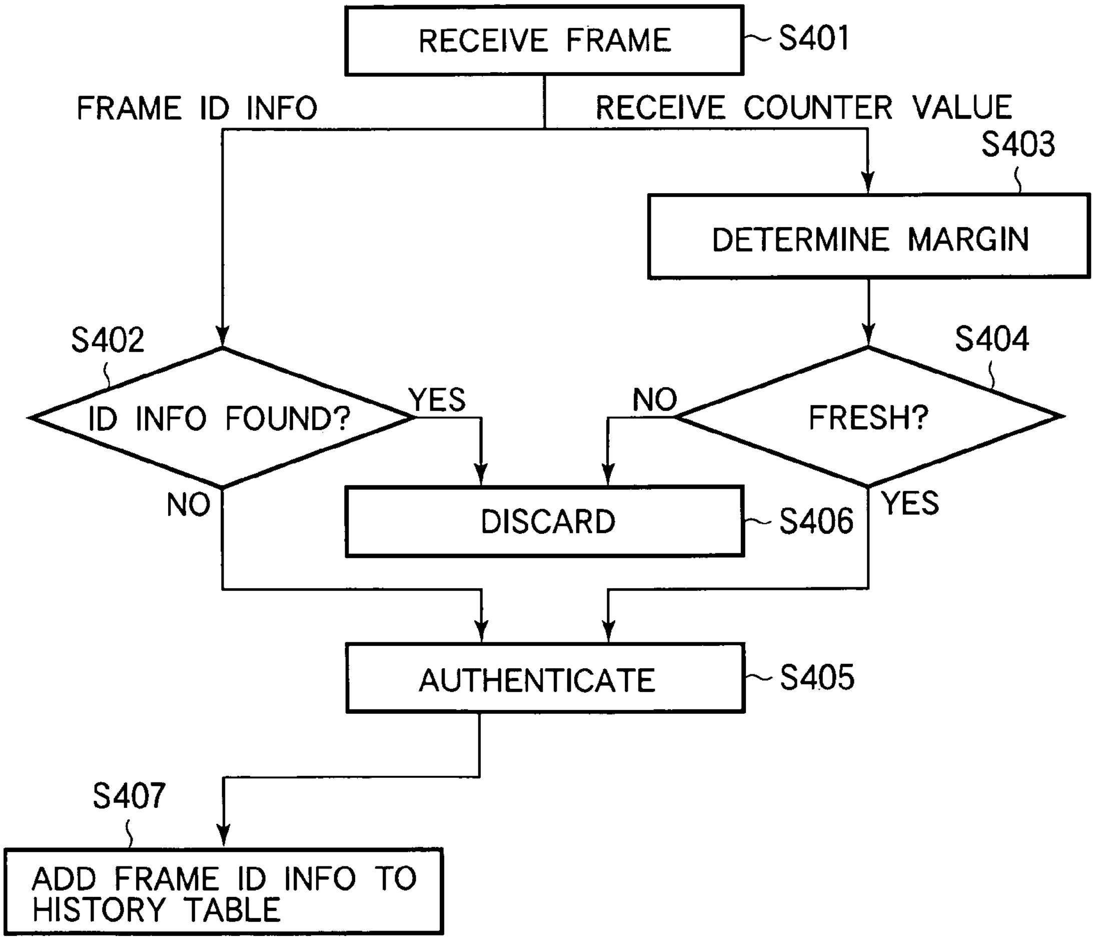
FIG. 12 is a flowchart illustrating the operation of the communication device on reception of a secure communication frame in the second embodiment.

The freshness determination operation in the second embodiment is illustrated in FIG. 12.

In step S401, the receiver 28 receives a one-hop communication frame, removes its transmitter and receiver addresses, and passes the remaining secure communication frame to the authentication processor 26. The authentication processor 26 sends the source address and time value in the secure communication frame as identifying information (frame ID info) to the history manager 15, and sends the time value, destination address, and hopcount to the time varying parameter manager 24.

In step S402, the history manager 15 searches for matching identifying information in its history table. This step is the same as step S202 in the first embodiment.

In step S403, the time varying parameter manager 24 determines the margin β from the received hopcount and the number of hops on the route from the communication device 20 itself to the destination address, referred to below as the remaining hopcount. The remaining hopcount is determined from routing information supplied by the frame generator 22. One exemplary method of obtaining the margin β is to subtract the remaining hopcount from the received hopcount and multiply the resulting hopcount difference by a predetermined constant. The margin β is then proportional to the distance, measured in hops, from the communication device 20 to the source communication device. The purpose of the margin β is to allow for the multi-hop delay from the source address up to the communication device 20.

Other methods of calculating the margin may be used. For example, the margin may be the sum of a constant value, representing a system-wide clock synchronization tolerance, and a value proportional to the hopcount difference, representing an allowance for the multi-hop delay from the source address up to the communication device 20.

In step S404, the time varying parameter manager 24 subtracts the margin β determined in step S403 from the local time value to obtain a threshold value, and compares the received time value with the threshold value. The received secure communication frame is provisionally determined to be fresh if the received time value is not older than the threshold value.

If the received secure communication frame is provisionally determined to be fresh in both steps S402 and S404, then the authentication processor 26 authenticates the frame in step S405. Otherwise, the frame is discarded in step S406. If authentication succeeds in step S405, the history manager 15 adds an entry including the identifying information of the secure communication frame to its history table in step S407. Steps S405, S406, and S407 are similar to steps S204, S205, and S206 in the first embodiment.

Differing from the first embodiment, the time varying parameter manager 24 does not update the local time value according to the received time value, even if authentication succeeds. Moreover, since the margin β is variable, entries are not deleted from the history table when their time values are older than the local time value minus β. Entries may be deleted from the history table, however, when their time values are older than the local time value by more than a predetermined quantity, such as a quantity equal to the largest margin β that may occur in the system. Alternatively, entries may be allowed to accumulate in the history table until the table is full and then deleted, one by one, as new entries are added.

Figure 13:
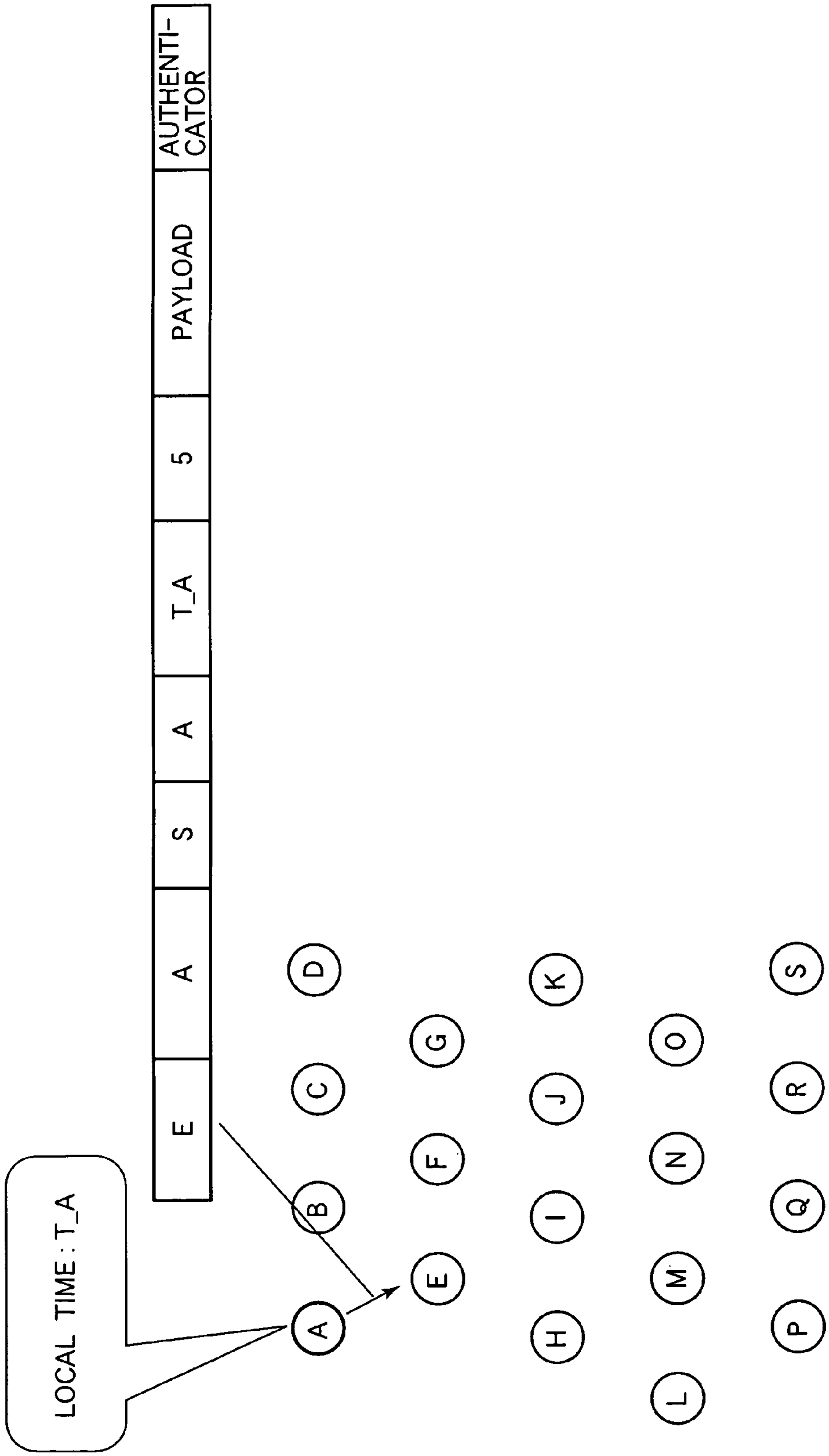
FIG. 13 illustrates the generation and transmission of a secure communication frame in the second embodiment.
Figure 14:
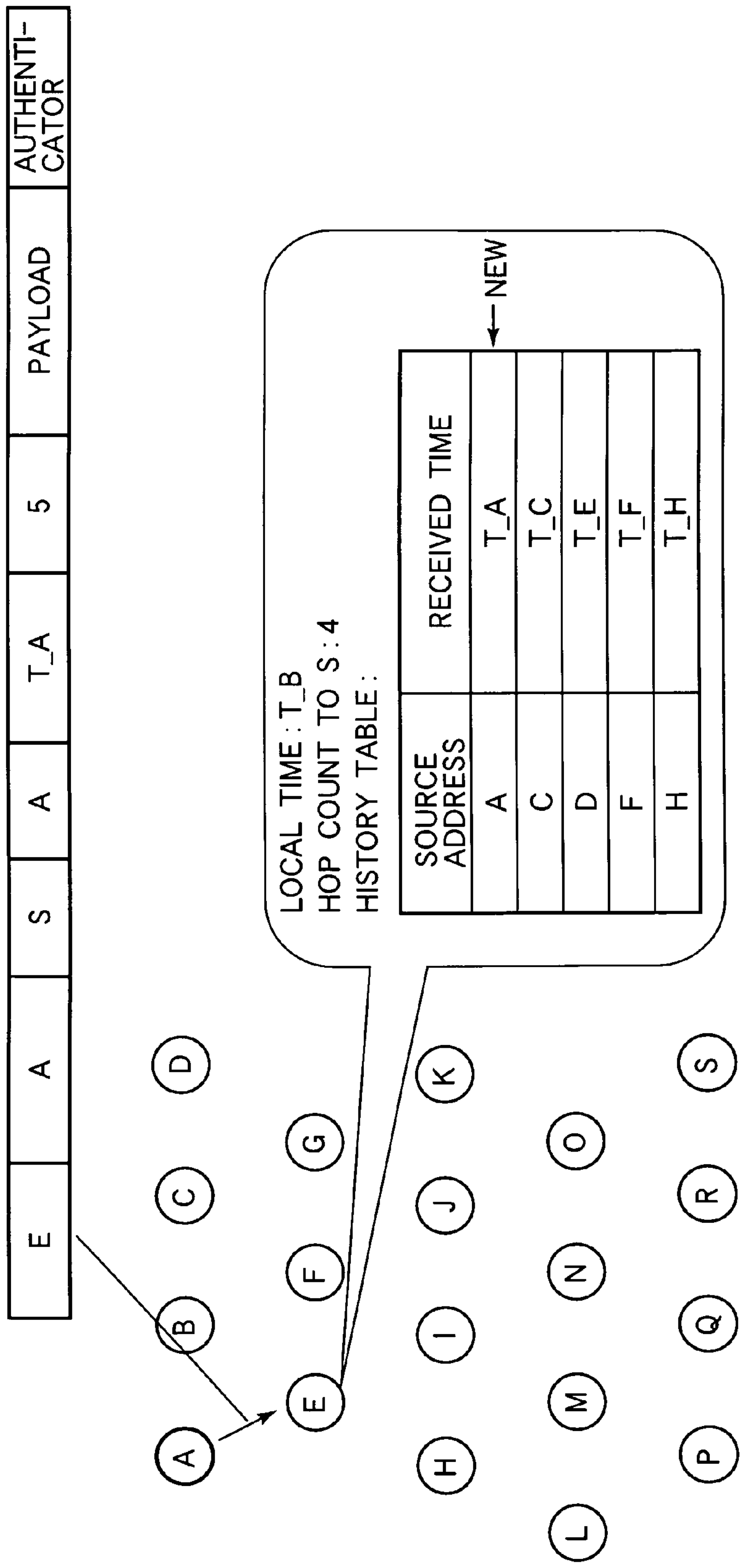
FIG. 14 illustrates the authentication of the secure communication frame in FIG. 13.
Figure 15:
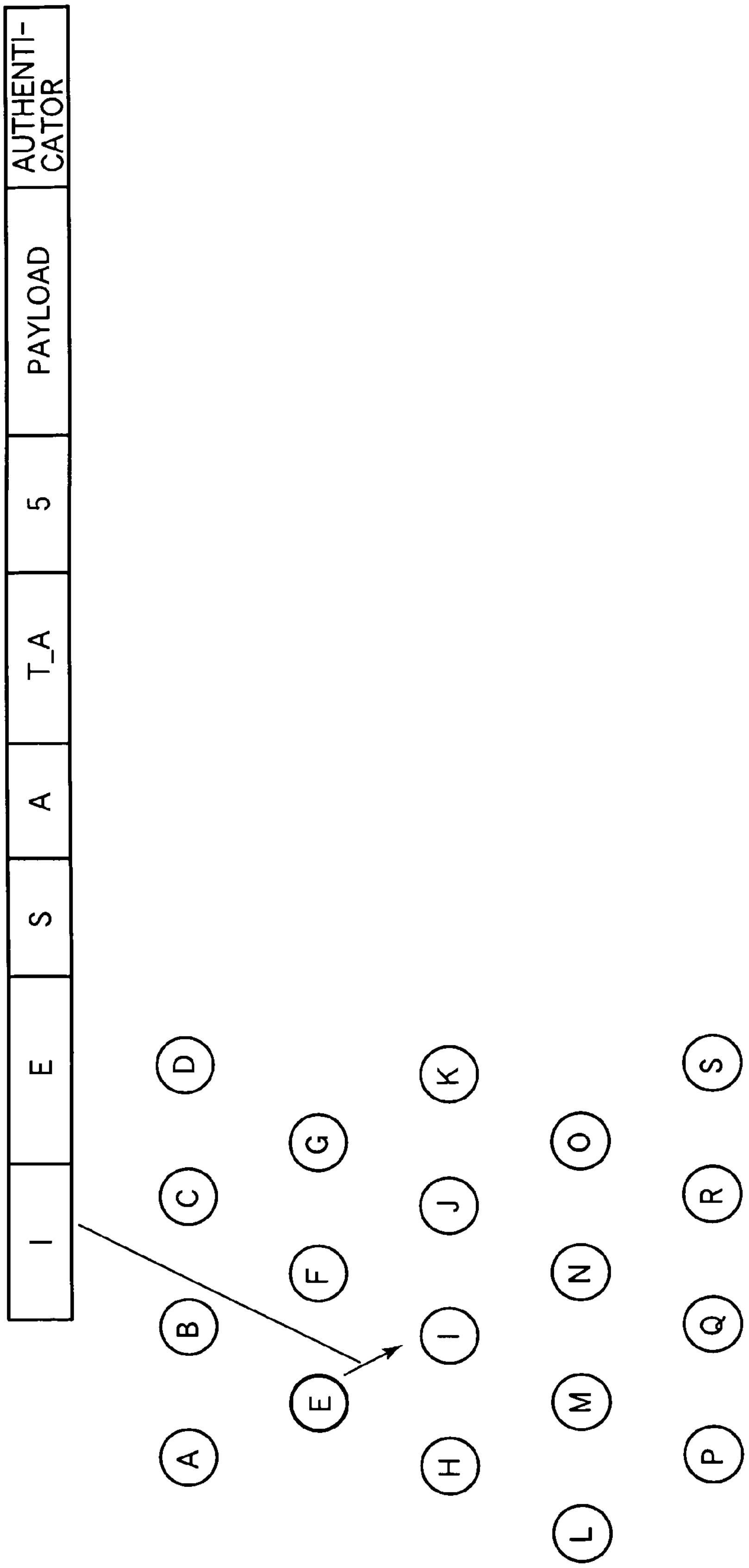
FIG. 15 illustrates the relaying of the secure communication frame in FIG. 13.

FIGS. 13 to 15 show specific examples of the operation of the second embodiment. The history table at communication device E is assumed to include entries for previously received secure communication frames generated at communication devices C, D, F, and H.

In FIG. 13, communication device A generates a secure communication frame destined for communication device S. The routing information in the frame generator 22 at communication device A indicates that this frame can reach communication device S in five hops, passing through, for example, intermediate communication devices E, I, N, and R. The time varying parameter manager 24 accordingly generates a secure communication frame with destination address 'S', source address 'A', the current local time value T_A obtained from the time varying parameter manager 24, a hopcount of '5', payload data, and an authenticator. The routing processor 27 encapsulates this secure communication frame in a one-hop communication frame by adding 'A' as the transmitter address and 'E' as the receiver address. The transmitter 17 transmits the one-hop communication frame.

In FIG. 14, the one-hop communication frame is received at communication device E. The receiver 28 at communication device E discards the receiver and transmitter addresses 'E' and 'A' and passes the remainder of the frame, constituting a secure communication frame, to the authentication processor 26. The authentication processor 26 passes the source address 'A' and time value 'T_A' to the history manager 15 and the destination address 'S', time value 'T_A', and hopcount '5' to the time varying parameter manager 24.

The history manager 15 determines that no entry with source address 'A' and time value 'T_A' is present in its history table. The time varying parameter manager 24 consults the routing information in the frame generator 22, finds that there is a four-hop route from communication device E to communication device S (passing through communication devices I, N, and R, for example), subtracts this hopcount '4' from the received hopcount '5', and calculates a margin β from the hopcount difference '1'. In this example the hopcount difference is minimal and the margin β has a correspondingly small value. The time varying parameter manager 24 then calculates a threshold by subtracting the margin β from its local time value T_B and compares the received time value (T_A) with the calculated threshold (T_B−β). It will be assumed that the received time value is newer than (e.g., greater than) the threshold value, so that this freshness test also passes.

The authentication processor 26 is notified by the history manager 15 and time varying parameter manager 24 that both freshness tests have passed and proceeds to authenticate the secure communication frame. It will be assumed that authentication succeeds. The history manager 15 then adds a new entry with source address 'A' and time value 'T_A' to the history table.

The transmitted one-hop frame ds also received at communication device B, but it is immediately discarded by the receiver 28 at communication device B, without authentication or freshness testing, because it is not addressed to communication device B.

Referring to FIG. 15, the authentication processor 26 at communication device E passes the received secure communication frame as is to the routing processor 27, which encapsulates it in a one-hop communication frame having transmitter address 'E' and receiver address 'I'. The encapsulated secure communication frame remains unchanged, with source address 'A', destination address 'S', time value 'T_A', and hopcount '5'. The transmitter 17 at communication device E transmits this one-hop communication frame to communication device I.

The secure communication frame continues to be relayed in this way until it reaches communication device S. At each successive hop, the calculated value of β increases, enlarging the freshness margin to compensate for the increasing elapsed time since the frame was generated at communication device A.

When a broadcast frame is received in the second embodiment and its freshness is tested, the margin β may be determined from, for example, the hopcount from the receiving communication device to the most distant communication device in the system, or the hopcount from the receiving communication device to the source address.

Like the first embodiment, the second embodiment provides a pair of freshness tests that require neither the storage of large amounts of history information nor the precise synchronization of the time varying parameters maintained at different communication devices, and enables secure communication frames to be transmitted with low delay because the security transform does not have to be repeated at each hop.

In a variation of the second embodiment, the time varying parameter manager 24 adjusts its local time value according to the time values in certain received communication frames, such as communication frames broadcast from a particular communication device.

The invention is not restricted to the embodiments described above. For example, the communication system need not have a mesh topology; it may have a tree topology or any other topology requiring multi-hop communication.

The invention may be applied to multicast communication as well as unicast and broadcast communication.

The secret key and the authentication key need not be the same throughout the communication system. For example, in a communication system with two or more multicasting groups, a separate secret key and authentication key may be provided for each group.

The security transform may be executed on only part of the communication frame instead of being executed on the entire communication frame. In this case, in multi-hop transmission, intermediate communication devices may modify the part of the communication frame that is not used in the security transform.

The margin of the time varying parameter may be varied according to the transmission behavior of the communication devices in the communication system. In the first embodiment, for example, if a communication device broadcasts a large number of secure communication frames in a short time, it may set a comparatively large margin to allow for a comparatively large difference between the oldest and newest values of the counter values maintained within the communication system.

When the received time varying parameter is older than the local time varying parameter by exactly the margin, the freshness test may be deemed to have failed, instead of passing as in the embodiments above. This is equivalent to reducing the margin by one minimum unit, such as one count or one minimum unit of time.

Time varying parameters other than count values and time values may be used.

Those skilled in the art will recognize that further variations are possible within the scope of the invention, which is defined in the appended claims.

What is claimed is:

1. A communication device comprising:

a receiver for receiving a secure communication frame from another communication device, the received secure communication frame including received identifying information and a received time varying parameter, the received secure communication frame having been generated by a security transform performed on at least the received time varying parameter;

a history manager for maintaining received authentication history information and performing a first freshness test by searching for the received identifying information in the received authentication history information, the first freshness test failing if the received identifying information is found in the received authentication history information and passing if the received identifying information is not found in the received authentication history information;

a time varying parameter manager for maintaining a local time varying parameter and a margin, and performing a second freshness test by comparing the received time varying parameter with the local time varying parameter, the second freshness test failing if the received time varying parameter is older than the local time varying parameter by more than the margin, and passing if the received time varying parameter is not older than the local time varying parameter by more than the margin;

an authentication key manager for managing an authentication key related to the security transform; and an authentication processor for using the authentication key to authenticate the received secure communication frame when the first freshness test and the second freshness test both pass, the received secure communication frame being discarded without authentication if either the first or second freshness test fails.

2. The communication device of claim 1, wherein when authentication succeeds, the history manager adds the received identifying information to the received authentication history information.

3. The communication device of claim 1, wherein the received time varying parameter forms part of the received identifying information.

4. The communication device of claim 1, further comprising a transmitter for transmitting the received secure communication frame to another communication device as necessary, without performance of another security transform, if the first and second freshness tests both pass and authentication succeeds.

5. The communication device of claim 4, wherein the secure communication frame is received with attached single-hop address information, the communication device further comprising a routing processor for replacing the attached single-hop address information with new single-hop address information before the received secure communication frame is transmitted by the transmitter.

6. The communication device of claim 4, further comprising:

a secret key manager for managing a secret key; and a frame generator for generating a new communication frame including the local time varying parameter and using the secret key to transform the new communication frame to a new secure communication frame; wherein the transmitter also transmits the new secure communication frame.

7. The communication device of claim 6, wherein the time varying parameter is a counter value and the time varying parameter manager updates the counter value when the new communication frame is generated and transmitted.

8. The communication device of claim 6, wherein the frame generator places a source address, a destination address, and a hopcount value in the secure communication frame, the source address belonging to the communication device, the hopcount value indicating a number of hops from the source address to the destination address.

9. The communication device of claim 1, wherein the time varying parameter is a counter value.

10. The communication device of claim 9, wherein the time varying parameter manager updates the local time varying parameter if the received time varying parameter is newer than the local time varying parameter.

11. The communication device of claim 10, wherein the time varying parameter manager updates the local time varying parameter if the received time varying parameter is equal to the local time varying parameter.

12. The communication device of claim 1, wherein the time varying parameter is a time stamp.

13. The communication device of claim 1, wherein the time varying parameter manager varies the margin according to the received secure communication frame.

14. The communication device of claim 13, wherein the received secure communication frame includes a source address, a destination address, and a hopcount indicating a first number of hops from the source address to the destination address, and the time varying parameter manager determines the margin from at least one of the source address, the destination address, and the hopcount.

15. The communication device of claim 14, wherein the time varying parameter manager determines a second number of hops from the communication device to the destination address of the received secure communication frame, subtracts the second number of hops from the first number of hops to obtain a hopcount difference, and determines the margin from the hopcount difference, the margin increasing as the hopcount difference increases.

* * * * *